United States Patent [19]

Mutoh et al.

[11] Patent Number: 4,688,162
[45] Date of Patent: Aug. 18, 1987

[54] RECTIFIER CONTROL APPARATUS WITH IMPROVED POWER FACTOR

[75] Inventors: Nobuyoshi Mutoh, Hitachi; Keijiro Sakai, Hitachioota; Toshio Suzuki, Hitachi; Akiteru Ueda, Naka; Kenji Nandoh, Matsudo; Ikuo Okajima, Yachiyo, all of Japan

[73] Assignee: Hitachi, Ltd., Tokyo, Japan

[21] Appl. No.: 841,425

[22] Filed: Mar. 19, 1986

[30] Foreign Application Priority Data

Mar. 29, 1985 [JP] Japan .................................. 60-63658

[51] Int. Cl.[4] ............................................ H02M 7/06
[52] U.S. Cl. ..................................... 363/80; 323/222; 363/82; 363/126
[58] Field of Search ....................... 363/48, 79, 80, 81, 363/82, 89, 90, 126, 37, 45; 318/438, 729; 323/222, 207

[56] References Cited

U.S. PATENT DOCUMENTS

| 3,906,337 | 9/1975 | Depenbrock | 363/48 |
| 3,909,698 | 9/1975 | Nill | 363/79 |
| 4,212,277 | 10/1983 | Mitchell | 363/81 |
| 4,437,146 | 3/1984 | Carpenter | 363/79 |
| 4,533,986 | 8/1985 | Jones | 323/222 |

FOREIGN PATENT DOCUMENTS 198873 11/1984 Japan .................................. 323/222

Primary Examiner—William H. Beha, Jr.
Attorney, Agent, or Firm—Antonelli, Terry & Wands

[57] ABSTRACT

A single phase, full wave diode bridge circuit is connected with a chopper on its DC output side. An output voltage of the chopper is smoothed by a smoothing capacitor and thereafter supplied for a load. A current control apparatus forms a current reference signal which is synchronized with an AC voltage applied to the bridge circuit and has a magnitude corresponding to a current flowing through the load and produces a deviation signal between the current reference signal and an actual AC input current of the bridge circuit. The chopper is controlled in accordance with the deviation signal so that the AC input current follows the current reference signal, whereby the power factor and the waveform of the AC input current in the bridge circuit are improved.

7 Claims, 15 Drawing Figures

RECTIFIER CONTROL APPARATUS WITH IMPROVED POWER FACTOR

BACKGROUND OF THE INVENTION

1. Field of the Invention

The present invention relates to a control apparatus for a rectifying circuit adapted to improve the power factor and the waveform of an AC input current flowing through the rectifying circuit formed of a diode bridge.

2. Description of the Related Art

Generally, in order to simply realize a DC power source, there is used a rectifying circuit which obtains a DC power by rectifying an AC power through a diode bridge circuit and then smoothing it through a capacitor. An AC input current flowing through such a rectifying circuit is dependent on the difference between an AC input voltage of the circuit and the charged voltage of the smoothing capacitor. The capacitor is usually charged up to nearly the peak value of the AC input voltage of the diode bridge circuit, and hence the AC input current begins to flow only when the AC input voltage increases nearly to its peak value. Accordingly, the AC input current pulsates, having a greatly distorted waveform including low order harmonic components such as the third and the fifth harmonics. To improve such a waveform of the AC input current, it has been practice to provide a voltage boosting chopper circuit between the DC output side of the diode bridge circuit and the smoothing capacitor so that the waveform of the AC input current approaches a sine wave.

An apparatus as disclosed in the Japanese Patent Laid-open No. 59-198873 is known, for example. According to this, a signal corresponding to the AC input voltage of a diode bridge circuit is multiplied by the deviation between a constant reference voltage and the actual voltage of a smoothing capacitor to obtain a current reference signal synchronized with the AC input voltage, and a chopper circuit provided between the diode bridge circuit and the smoothing capacitor is so operated as to make the AC input curren follow the current reference signal to thereby improve the power factor and the waveform of the AC input current.

I such an apparatus, however, there are problems described below. Capacitance of the smoothing capacitor is usually as large as 2000 to 3000 μF, in case the rectifying circuit is used as a DC power source for a voltage source type inverter, which supplies three phase AC power for an induction motor of an air conditioning appliance, a belt conveyor and so on. In such cases, the induction motor, and therefore the DC power source, must be able to cope with the widely varying load and to often bear the suddenly changing load, i.e. an impact load. However, since the smoothing capacitor is of large capacitance, the terminal voltage of the capacitor does not change unless the load varies to a considerable degree; especially in the low load region, it scarcely changes. As a result, the deviation signal between the constant reference voltage and the actual voltage of the smoothing capacitor is not produced, so that the copper circuit does not operate and hence the function of improving the power factor and the waveform of the AC input current fails to be attained.

In the case of the impact load, a load current increases rapidly, while the change in the voltage of the capacitor is delayed due to the large capacitance. This delay results in the delay of the control of the capactor voltage. Thereby the condition of the over current is temporarily brought about. Further, the delay of change in the capacitor voltage also causes the result that it takes more time until appearance of the desired deviation between the constant reference voltage and the capacitor voltage. Therefore, the effect of improving the power factor and the waveform of the AC input current can not be obtained sufficiently until the desired deviation signal appears.

SUMMARY OF THE INVENTION

An object of the present invention is to provide a control apparatus for a rectifying circuit having a rectifying means for converting an AC voltage into a DC voltage, a chopper means connected with the rectifying means, a smoothing capacitor for smoothing an output voltage of the chopper means to supply a DC load with a smoothed DC voltage, and a current control means for controlling the chopper means to adjust an AC input current of the rectifying means, whereby the power factor and the waveform of the AC input current can be remarkably improved.

A feature of the present invention is in that the control of the chopper means is conducted in accordance with a deviation signal between a signal corresponding to the AC input current or the equivalent thereto and a current reference signal which is synchronized with the AC voltage and has the magnitude corresponding to that of the DC load or the equivalent thereto.

According to another feature of the present invention, there is further provided means for compensating the deviation signal, whereby the AC input current with a stable power factor of substantially one is obtained even in the widely varying load and a waveform of the AC input current can be much improved.

DESCRIPTION OF THE PREFERRED EMBODIMENTS

Figure 1:
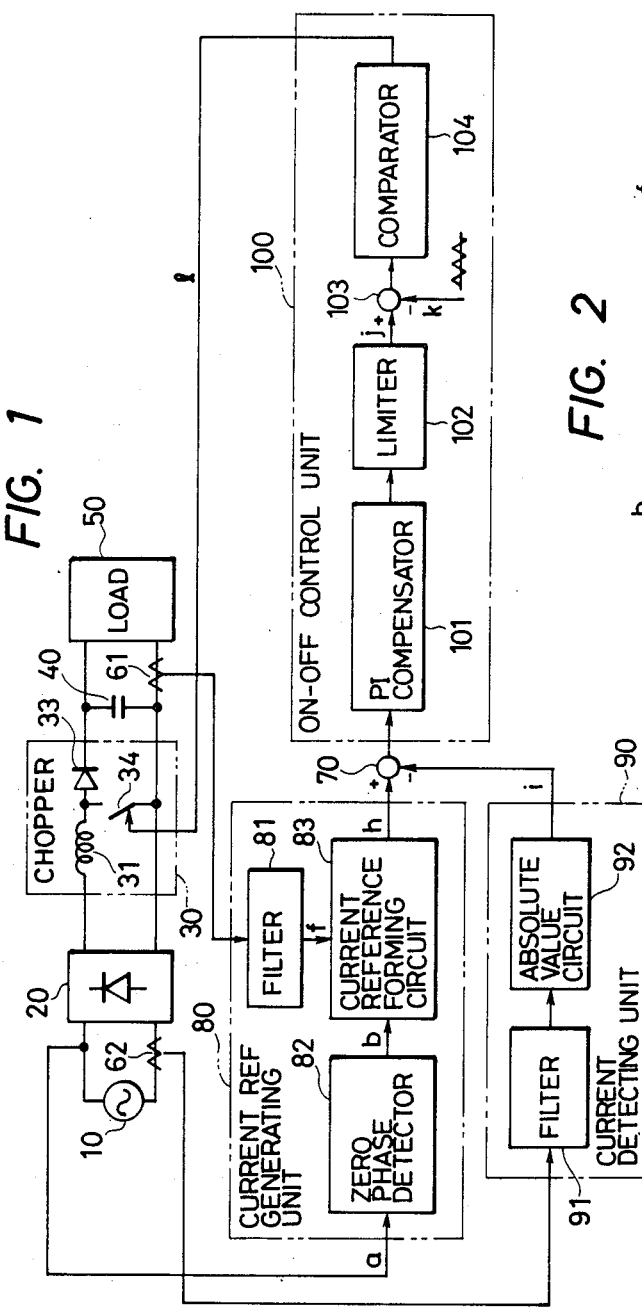
FIG. 1 is a block diagram schematically showing a control apparatus for a rectifying circuit according to an embodiment of the present invention.

In FIG. 1, an AC voltage from a single phase AC power source 10 is applied to a rectifier circuit 20 formed of bridge-connected diodes. The circuit 20 generates a DC voltage which is obtained by the full-wave rectification of the AC voltage from the single phase AC power source 10, and the output of the circuit 20 is applied to a chopper circuit 30 connected to the DC side of the circuit 20. The chopper circut 30 is formed of a reactor 31 connected in series with one of DC output buses of the bridge circuit 20, a diode 33 and a switching element 34, such as a power transistor which shortcircuits the DC output buses of the bridge circuit 20 through the reactor 31. If the chopper circuit 30 is required to operate at a high frequency, the use of a field effect transistor for the switching element 34 is very effective.

The chopper circuit 30 is connected with a smoothing capacitor 40, which repeats the charge and discharge of the energy to smooth the output DC voltage of the chopper circuit 30. The DC voltage smoothed by the smoothing capacito 40 is applied to a load 50.

The rectifying circuit as described above is equipped with the following control apparatus in order to realize a high power factor and obtain an AC input current of the improved waveform. Namely, the control apparatus comprises a current reference generating unit 80 for generating a reference for the AC input current, a current detecting unit 90 for detecting an actual AC input current, an ON-OFF control unit 100 for controlling the duty ratio of the ON-OFF operation (the rate of conductive state with respect to the period of the ON-OFF operation) of the switching element 34 in accordance with the deviation of the actual AC input current from the reference thereof, and a subtractor 70 for obtaining the aforesaid deviation. Further there are provided two current detectors, one 61 of which detects a DC load current and the other 62 detects the AC current.

The current reference generating unit 80 is formed of a filter 81, a zero phase detector 82 and a current reference forming circuit 83. A load current flowing through the load 50 is detected by the current detector 61 and is applied to the filter 81 in which the detected signal of the current flowing through the load 50 is smoothed to become a load level signal f proportional to the load. The zero phase detector 82 detects the time point at which an AC voltage a from the AC power source 10 becomes zero. A zero phase signal b detected by the zero phase detector 82 is applied to the current reference forming circuit 83. If a photo-coupler is used for the detecting part of the AC voltage in the zero phase detector 82, the zero phase signal b can be detected with the sufficient insulation from the AC power source 10.

Figure 2:
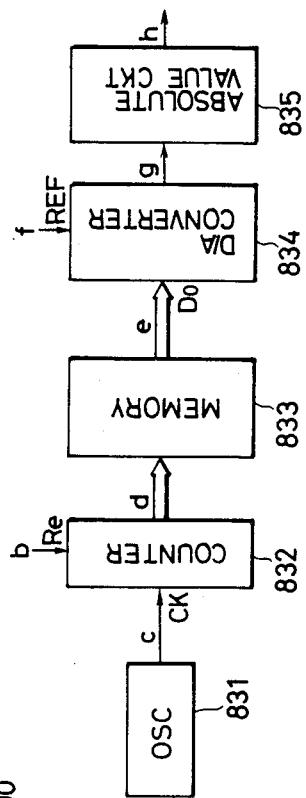
FIG. 2 is a block diagram schematically showing an example of a current reference forming circuit used in the control apparatus shown in FIG. 1.

An example of the detailed structure of the curent reference forming circuit 83 is shown in FIG. 2. In the figure, an oscillator 831 generates a high frequency clock signal c which is applied to a clock terminal CK of a counter 832. Assuming that the frequency of the AC voltage is 50 Hz and a 10 bit counter is used for the counter 832, the adequate frequency of the clock signal c is about 50 kHz. To a reset terminal Re of the counter 832, the zero phase signal b is applied.

Further, an output signal d from the counter 832 is led to an address terminal of a memory 833. The memory 833 stores therein data concerning a sine wave corresponding to address, as described in detail later. The sine wave data e corresponding to the variation of the signal d given from the counter 832 as the address signal are read out successively and applied to a data input terminal $D_o$ of a DA converter 834. The load level signal f is applied to a reference terminal REF of the D/A converter 834, so that the converter 834 generates a sine wave signal g proportional to the magnitude of the load level signal f and in the same phase as that of the AC voltage of the AC power source 10. The sine wave signal g is applied to an absolute value circuit 835 which takes the absolute value of the sine wave signal g and generates a current reference signal h.

Referring again to FIG. 1, the current detecting unit 90 is formed of a filter 91 and an absolute value circuit 92. The filter 91 serves to eliminate the components of higher frequencies than the operating frequency of the chopper circuit 30 in the detected AC input current and to derive the components of frequencies equal to or lower than the above mentioned operating frequency. The derived components of the AC input current is applied to the absolute value circuit 92 where the absolute value of the sine wave signal is taken.

Here if, instead of detecting the AC input current, the detection of the actual current is done between the rectifier circuit 20 and the chopper circuit 30, i.e. on the DC output side of the rectifier circuit 20, the absolute value circuit 92 can be omitted, because a current flowing therethrough is under the condition of the full wave rectification. The waveform of such a current is the same as that of the absolute value as described above. Such a current can be detected by a so-called DC current transformer (DCCT) inserted between the rectifier circuit 20 and the chopper circuit 30, the output of which is directly led to the subtractor 70 after passing through the filter 91. Generally, however, the DCCT is much more expensive than a current transformer which detects only an AC current. In the embodiment of FIG. 1, an AC current transformer can be employed as the curren detector 62 and hence the structure of this embodiment is economic in this point of view.

The output signal of the absolute value circuit 92 is given to the subtrator 70 as a current detecting signal i with the polarity shown. The subtractor 70 is adapted to obtain the deviation between the current reference signal h and the current detecting signal i. The deviation signal thus obtained is led to the ON-OFF control unit 100 which is formed of a compensation circuit 101, a limiter 102, a subtractor 103 and a comparator 104.

The compensation circuit 101 functions as a PI (proportional and integration) compensation circuit and performs a compensating operation so that an AC input current with a stabilized power factor of substantially one is obtained even whenthe load 50 is widely varied. Although the role of the limiter 102 is described in detail later, it only passes the output of the compensation circuit 101 to the subtrator 103 in the usual state of opeation. A current control signal j obtained through the compensation circuit 101 and the limiter 102 is given to one of the terminals of the subtractor 103, while a high frequency carrier signal (a triangular wave in this example) k is applied to the other terminal of the subtractor 103, so that the difference between the current control signal j and the triangular wave carrier signal k is taken. The frequency of the carrier wave k is determined depending on the operating frequency of a transistor used as the switching element 34. In an experiment by the inventors, the triangular wave carrier signal of 50 kHz has been used.

Further, the output signal of the subtractor 103 is led to the comparator 104, which applies to the switching element 34 an ON-OFF control signal 1 which goes high when the signal obtained from the subtractor 103 is positive and goes low when negative. The switching element 34 turns on when it receives the high level signal from the comparator 104. As a result, a closed circuit if formed by the diode bridge circuit 20, the reactor 31 and the switching element 34, and a current flows through the closed circuit. The switching element 34 turns off when it receives the lower level signal from the comparator 104 and the energy which is stored in the reactor 31 is transferred to the smoothing capacitor 40 through the diode 33. This energy varies in proportion to the duty ratio of the ON-OFF operation of the switching element 34.

Figure 3:
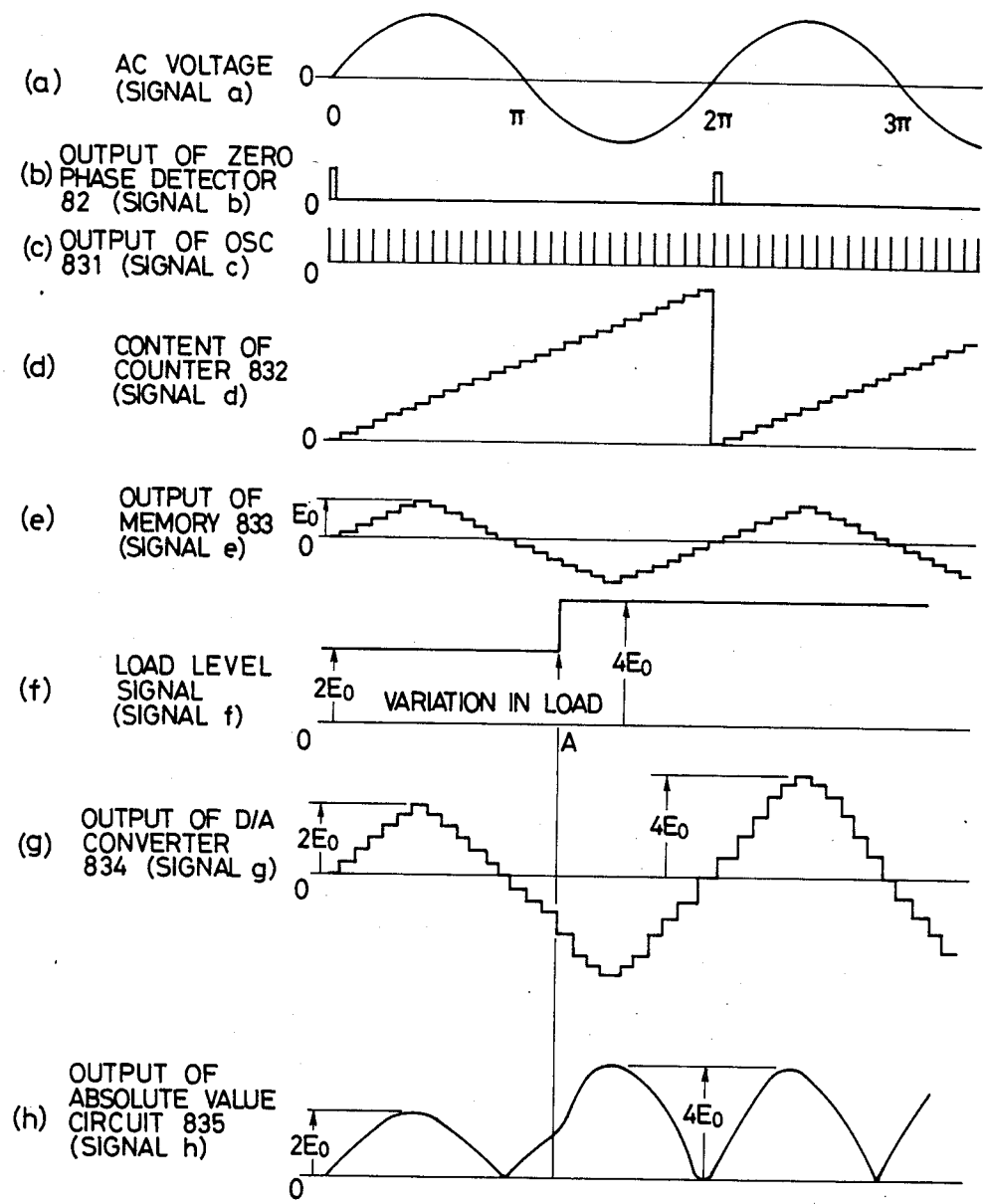
FIGS. 3(a)-(h) are waveform diagrams for illustrating the operation of the current reference forming circuit shown in FIG. 2.
Figure 4:
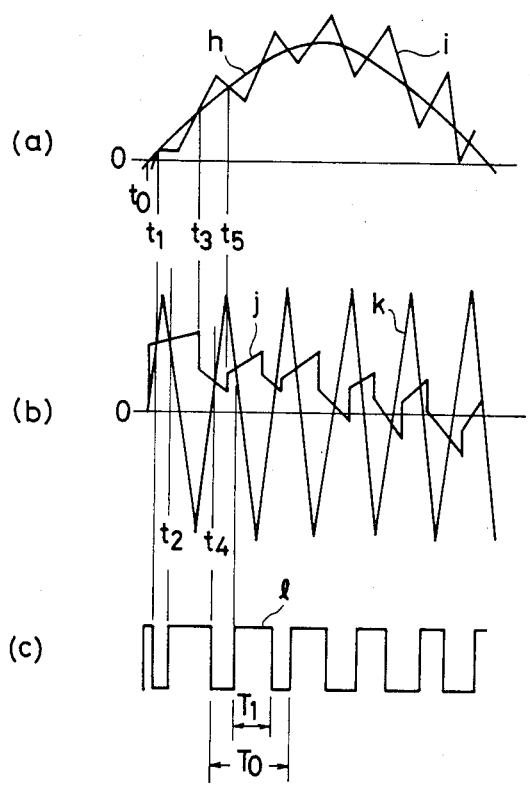
FIGS. 4(a)-(c) are waveform diagrams for explaining the operation of an ON-OFF control unit shown in FIG. 1.

Referring next to FIGS. 3 and 4, the description will be made of the operation of the embodiment mentioned above. First of all, FIG. 3 is a waveform diagram showing a process through which a current reference signal is obtained. The zero phase detector 82 generates the zero phase signal b shown in FIG. 3(b) at the time point when the AC voltage a shown in FIG. 3(a) is zero. The zero phase signal b can be obtained with ease such that the AC voltage a is rectified by a half-wave rectification, the rectified voltage is compared to the zero level voltage to obtain a square wave voltage and only the leading edge of the square wave voltage is used in order to form the zero phase signal b. The counter 832 clears its content and restarts to count up the clock signal c (cf. FIG. 3(c)) produced by the oscillator 831 every time it receives the zero phase signal b. Such an operation of the counter 832 is repeated, so that the output d as shown in FIG. 3(d) appears at the output terminal of the counter 832. The output signal d of the counter 832 is applied to the memory 833. As described before, the memory 833 is so connected as to make the signal d an address signal and stores therein the data concerning one cycle of the sine wave corresponding to the address. Accordingly, as the content of the counter 832, which serves as the address signal, changes as shown in FIG. 3(d), the digital values indicative of the instantaneous values of the sine wave are read out from the memory 833 successively. If the digital values read out are plotted with respect to time, the change thereof becomes as shown in FIG. 3(e). Namely, the sine wave e with a certain amplitude $E_0$ is approximated.

These digital data are applied to the data input terminal $D_0$ of the D/A converter 834. Further, the load level signal f having, for example, the magnitude $2E_0$ (cf. FIG. 3(f)) is given to the reference terminal REF of the D/A converter 834. In the D/A converter 834, the sine wave e is converted to an analogue amount and further multiplied by the magnitude $2E_0$ of the load level signal f so that, as shown in FIG. 3(g), the sine wave signal (analogue signal) g proportional to the magnitude of the load level signal f is obtained from the D/A converter 834. For example, assuming that the load is varied to $4E_0$ at the point A as shown in FIG. 3(f), the amplitude of the sine wave g will also vary at the point A, as shown in FIG. 3(g). The sine wave signal g is led to the absolute value circuit 835, in which the absolute value of the sine wave signal g is taken and the stepwise absolute value signal is smoothed. As a result, the current reference signal h shown in FIG. 3(h) is obtained.

As described before, the thus obtained current reference signal h is led to the subtractor 70, in which the deviation of the reference signal h and the actual current detecting signal i is detected. The ON-OFF control unit 100 controls the duty ratio of the ON-OFF operation of the chopper 30 in accordance with the detected deviation. As a result, the relation between the current reference signal h and the actual current detecting signal i becomes as shown in FIG. 4(a). The figure shows the change in both the signals h and i during only a half cycle.

To begin with, the magnitude of the current reference signal h at a time point $t_0$ is larger than that of the current detecting signal i as shown in FIG. 4(a) and hence the subtractor 70 generates a positive deviation signal, which is applied to the compensation circuit 101. The deviation signal is compensated by a proportional gain $K_p$ and an integration gain $K_i$ therein and applied as a signel j to the subtractor 103 through the limiter 102. Namely, the positive deviation produced at the time point $t_0$ is at first multiplied by the proportional gain $K_p$. Further the signal j increases by the positive deviation being integrated by an integrating function of the compensation circuit 101 while there exists the positive deviation between the current reference signal h and the current detecting signal i. In this example, the signal i increases until a time point $t_3$, as shown in FIG. 4(b).

The current detecting signal i exceeds the current reference signal h at a time point $t_3$, so that the negative deviation is generated from the subtractor 70. Accordingly, the signal j rapidly decreases by the proportional gain $K_p$ and thereafter gradually reduced by the negative deviation being integrated until a time point $t_5$ when the current detecting signal i becomes less than the current reference signal h again. After the time point $t_5$, the operation as described above is repeated, and the signal j as shown in FIG. 4(b) is obtained.

The thus obtained current control signal j is inputted to the subtractor 103, in which the subtraction between the signal j and the triangular carrier signal k is made. As shown in FIG. 4(b), the signal j produced at the time point $t_0$ is larger than the carrier signal k and hence the subtractor 103 produces the positive deviation. In response to the positive deviation, the comparator 104 outputs the control signal 1 which renders the chopper 30 conductive. At a time point $t_1$, the carrier signal k exceeds the signal j, so that the negative deviation is generated in the subtractor 103. Accordingly, the comparator 104 stops outputting the control signal 1 and therefore the chopper 30 is made nonconductive. Since the carrier signal k decreases after its reaching to the maximum value, it becomes smaller than the signal j at a time point $t_2$, so that the subtractor 103 furnishes the positive deviation. Accordingly, the comparator 104 generates the control signal 1 which renders the chopper 30 conductive. At a time point $t_4$, the carrier signal k becomes larger than the signal j again and hence the negative deviation is produced by the subtractor 104. As a result, the control signal 1 disappears so that the chopper 30 turns off. By the repetition of the operation as mentioned above, the ON-OFF control signal 1 as shown in FIG. 4(c) is obtained from the ON-OFF control unit 100. In respnse to the thus obtained ON-OFF control signal 1, the chopper 30 repeats the ON-OFF opoeration.

By the way, if the current control signal j accidentally exceeds the positive or negative maximum value, i.e. the respective peak value of the carrier signal k, either one of the positive and negative deviations between the signal j and the carrier signal k continues to be produced, so that it becomes impossible to control the chopper circuit 30. To prevent this, the limiter 102 limits the magnitude of the output of the compensation circuit 101.

Here, the operating period $T_0$ of the ON-OFF operation depends on the carrier signal k, and the ON duration $T_1$ of the chopper 30 is determined by the deviation of the signal j and the carrier signal k. Therefore, the duty ratio $T_1/T_0$ of the ON-OFF operation varies with the change of the deviation, and the current flowing through the bridge circuit 20 is changed in accordance with this duty ratio $T_1/T_0$ to follow the current reference signal h. Since the current reference signal h is in synchronism with the AC voltage and its magnitude varies in proportion to the load, the AC input current synchronized with the AC voltage and meeting the load flows through the bridge circuit 20, resulting in the improved power factor and waveform.

Well, the power factor and the waveform of the AC input current will be much improved, if the AC input current accurately follows the current reference signal h especially around the zero point thereof. To achive this, it is sufficient to increase the sensitivity of the current control signal j around the zero point of the current reference signal h with respect to the current deviation signal obtained by the subtractor 70. This is based on the following reason. Namely, around the zero point of the current reference signal h, also the AC voltage is very small. Under such condition, the AC input current is difficult to flow, following the current reference signal h. As a result, the waveform of the AC input current is slightly distorted for such a duration. In order to improve this, the gain of the compensation circuit 101 is heightened around the zero point of the current reference signal h, that is to say, the sensitivity of the current control signal j is increased, so that the large current control signal j can be obtained. As is seen from FIG. 4(b), the larger current control signal j causes the longer ON duration of the chopper 30. Namely, around the zero point of the current reference signal h, the ON duration of the chopper 30 is made longer than usual and the AC input current is forcibly flowed. Thereby, the waveform of the input current around the zero point is improved and hence the power factor is heightened.

Figure 5:
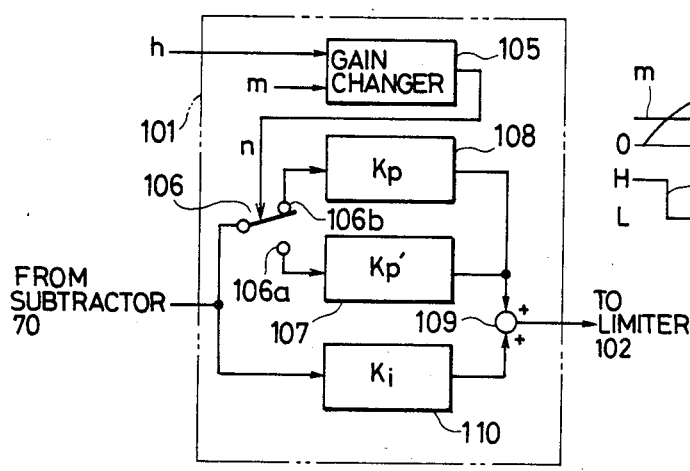
FIG. 5 is a block diagram showing an example of a compensation circuit used in the control apparatus shown in FIG. 1.
Figure 6:
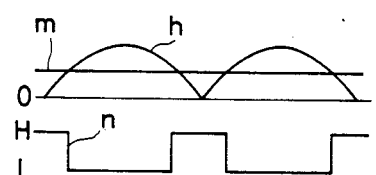
FIG. 6 is a waveform diagram for explaining the operation of the compensation circuit shown in FIG. 5.

FIG. 5 shows such an embodiment of the present invention that is adapted to further improve the power factor and the waveform of the AC input current by making the proportional compensation gain $K_p$ of the compensation circuit 101 variable. In this figure, a gain changer 105 is adapted to compare the current reference signal h with a set value m and to generated a gain switching signal n. As is shown in FIG. 6, the gain switching signal n goes to a high level (H) in the range where the current reference signal h is smaller than the set value m. Otherwise, the signal n is kept at a low level (L). The set value m can be determined at such an arbitrary value as provides the high proportional gain in a desired range around the zero point of the current reference signal h. The gain switching signal n is led to a switch 106 as a changeover signal. When the gain switching signal n is at high level, a movable contact of the switch 106 is connected with a fixed contact 106a to select a gain element 107 having a proportional gain $K'_p$ which is larger than the gain $K_p$. To the contrary, when the gain switching signal n is at low level, the movable contact is connected with a fixed contact 106b so that a gain element 108 having a proportional gain $K_p$ is selected. In this way, the deviation signal from the subtractor 70 is selectively compensated by the proportional gain $K_p$ or $K'_p$ in response to the level of the current reference signal h. The thus compensated deviation signal is added in an adder 109 to a signal from a gain element 110 having an integration gain $K_i$. An output of the adder 109 is led to the limiter 102.

The above description of the embodiments has been made with no particular reference to the kind of the load. As one of typical examples, the load may be a voltage source type inverter for inverting a DC power obtained from the rectifying circuit to an AC power and supplying an induction or a synchronous motor with the inverted AC power. In such a case, a component of a current flowing into the motor which contributes generation of the torque can be used as a load level signal in the sense of the present invention. If, in the case of an induction motor, the accuracy is not required so severely, the average value of a primary current can be also utilized. Further, the difference between a reference for a rotational speed and an actual value thereof can be substitued as a load level signal for the current flowing through the load. Especially, in the case of an induction motor, the above said speed difference depends on a so-called slip, and such a slip is almost in proportion to the degree of the load. Accordingly, the slip frequency in an induction motor can be employed as a load level signal.

Further, in the above description, a signal having the waveform of the absolute valueof a sine wave has been made the current reference signal h. However, it is also possible to control the rectifying circuit with the same effect in such a manner that, instead of using the absolute value circuit 835 in the current reference forming circuit 83 and the absolute vlaue circuit 92 in the current detecting unit 90, the ON-OFF control signal 1 is obtained by using an alternating sine wave as the current reference signal and the AC input current as the current detecting signal.

Further, the sine wave may be substituted by a trapezoidal wave, and regarding the carrier wave which has been described hereinabove as triangular, it can of course be in the saw-tooth form.

As will be seen from the foregoing, the control device according to the present invention operates such that a rectifying circuit is controlled by a sine wave current reference signal proportional to the load and synchronized with an AC input voltage, so that it is possible to obtain an AC input current corresponding to the amount of load even in a low load condition thereby to improve the power factor and the waveform of the AC input current.

What is claimed is:

1. A control apparatus for a rectifying circuit comprising:
    a rectifying means for converting an AC voltage into a DC voltage;
    a chopper means connected with rectifying means on its DC output side;
    a smoothing capacitor for smoothing the output voltage of the chopper means to apply a smoothed DC voltage to a load; and
    a current control means for producing a deviation signal between a predetermined current reference signal and an AC input current of the rectifying means and controlling the ON-OFF operation of the chopper means in accordance with the deviation signal,
characterized in that
    said current control means includes means for generating as the current reference signal a signal which has a magnitude corresponding to a magnitude of the load and is synchronized with the AC voltage.

2. A control apparatus for a rectifying circuit as defined in claim 1, wherein said current reference signal generating means comprises means for producing a zero crossing signal every one cycle of the AC voltage at a time point at which the AC voltage becomes zero and means for forming the current reference signal in response to the zero crossing signal.

3. A control apparatus for a rectifying circuit as defined in claim 2, wherein said current reference signal forming means comprises means for generating a sine wave signal having a constant amplitude in response to the zero crossing signal and means for multiplying the sine wave signal by an amount corresponding to the magnitude of the load.

4. A control apparatus for a rectifying circuit as defined in claim 1, wherein said current reference signal is generated in the form of an absolute value signal and the AC input current is also detected in a form of the absolute value signal.

5. A control apparatus for a rectifying circuit as defined in claim 1, wherein said current control means includes means for compensating the deviation signal by a predetermined compensation gain, and the ON-OFF operation of the chopper means is controlled in accordance with the compensated deviation signal.

6. A control apparatus for a rectifying circuit as defined in claim 5, wherein the predetermined compensation gain is changed in accordance with the level of the current reference signal.

7. A control apparatus for a rectifying circuit as defined in claim 1, wherein said means for generating generates a signal which has a magnitude corresponding to a magnitude of the load current.

* * * * *

UNITED STATES PATENT AND TRADEMARK OFFICE
CERTIFICATE OF CORRECTION

PATENT NO. : 4,688,162
DATED : August 18, 1987
INVENTOR(S) : Mutoh et al.

It is certified that error appears in the above—identified patent and that said Letters Patent is hereby corrected as shown below:

<u>IN THE TITLE PAGE</u>, after "UNITED STATES PATENT [19]", delete "Mutch et al." and insert --Mutoh et al.--

Signed and Sealed this

Twenty-fourth Day of May, 1988

Attest:

DONALD J. QUIGG

*Attesting Officer*  *Commissioner of Patents and Trademarks*